US012421076B2

(12) United States Patent
Scoville et al.

(10) Patent No.: US 12,421,076 B2
(45) **Date of Patent: *Sep. 23, 2025**

(54) ELEVATOR CALL REGISTRATION WHEN A CAR IS FULL

(71) Applicant: OTIS ELEVATOR COMPANY, Farmington, CT (US)

(72) Inventors: Bradley Armand Scoville, Farmington, CT (US); Sandeep Sudi, Farmington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 197 days.

This patent is subject to a terminal disclaimer.

(21) Appl. No.: 18/220,350

(22) Filed: Jul. 11, 2023

(65) Prior Publication Data

US 2023/0348225 A1 Nov. 2, 2023

Related U.S. Application Data

(63) Continuation of application No. 16/258,836, filed on Jan. 28, 2019, now Pat. No. 11,767,193.

(51) Int. Cl.
*B66B 1/24* (2006.01)
*B66B 1/34* (2006.01)

(52) U.S. Cl.
CPC .......... *B66B 1/2458* (2013.01); *B66B 1/3476* (2013.01); *B66B 2201/215* (2013.01); *B66B 2201/222* (2013.01)

(58) Field of Classification Search
CPC ................ B66B 1/2458; B66B 1/3476; B66B 2201/215; B66B 2201/222; B66B 1/06; B66B 1/3423; B66B 1/3446; B66B 1/46
See application file for complete search history.

(56) References Cited

U.S. PATENT DOCUMENTS

| | | | |
|---|---|---|---|
| 3,065,825 | A | 11/1962 | Yeasting |
| 3,967,702 | A | 7/1976 | Iwaska et al. |
| 3,973,649 | A | 8/1976 | Iwasaka et al. |
| 4,323,142 | A | 4/1982 | Bittar |
| 4,363,381 | A | 12/1982 | Bittar |
| 5,022,497 | A | 6/1991 | Thanagavelu |
| 5,024,295 | A | 6/1991 | Thangavelu |

(Continued)

FOREIGN PATENT DOCUMENTS

| | | | | |
|---|---|---|---|---|
| EP | 3428099 | A1 * | 1/2019 | ............... B66B 1/14 |
| EP | 3686143 | A | 7/2020 | |
| JP | H0597333 | A | 4/1993 | |

OTHER PUBLICATIONS

Extended European Search Report for Application EP 19219272.2 dated Jun. 23, 2020.

*Primary Examiner* — Jeffrey Donels

(74) *Attorney, Agent, or Firm* — Carlson, Gaskey & Olds, P.C.

(57) ABSTRACT

An illustrative example elevator system includes a plurality of elevator cars. A dispatch controller assigns a first one of the elevator cars to travel to a landing in response to a first request for elevator service at that landing. At least one call button is operative to place a second request while the first one of the elevator cars is situated at the landing in response to the first request. The dispatch controller assigns a second one of the elevator cars to travel to the landing in response to the second request.

19 Claims, 2 Drawing Sheets

(56) References Cited

U.S. PATENT DOCUMENTS

| | | | | |
|---|---|---|---|---|
| 5,467,844 | A * | 11/1995 | Powell ...................... | B66B 1/18 187/383 |
| 5,490,580 | A | 2/1996 | Powell et al. | |
| 11,767,193 | B2 * | 9/2023 | Scoville ................ | B66B 1/3476 187/393 |
| 2017/0174469 | A1 * | 6/2017 | Chapman .................. | B66B 9/00 |
| 2018/0044132 | A1 | 2/2018 | Fauconnet | |
| 2018/0257909 | A1 | 9/2018 | Yoshimura | |
| 2019/0016557 | A1 | 1/2019 | Baldi | |
| 2019/0389689 | A1 * | 12/2019 | Jia ......................... | B66B 1/2458 |
| 2020/0130992 | A1 | 4/2020 | Simcik et al. | |

* cited by examiner

ELEVATOR CALL REGISTRATION WHEN A CAR IS FULL

CROSS REFERENCE TO RELATED APPLICATIONS

This application claims priority to U.S. application Ser. No. 16/258,836, filed Jan. 28, 2019, and is incorporated by reference.

BACKGROUND

Elevator systems have proven effective for carrying passengers among different levels within a building. There are circumstances where the number of passengers requiring elevator service at a particular time seems to exceed the elevator system capacity when using a typical dispatching or scheduling algorithm. A variety of specialized scheduling algorithms have been developed for up peak and down peak traffic conditions. Not all systems include such specialized scheduling and there still are scenarios in which passengers find themselves waiting for an elevator car or unable to board an elevator car that has been sent in response to their call for service.

For example, during checkout time in a hotel, there tends to be an increase in the amount of down traffic. Elevator cars responding to calls at higher levels in the building quickly fill up but still stop at intermediate floors on the way to the building lobby. At such intermediate floors, the elevator car stops and the doors open but no one else is able to board the car. Many times the passengers at the landing will immediately press the hall call button again while the elevator car is still at that landing. The typical result when this happens is that the car doors will reopen keeping the already full car at that landing even longer. This type of scenario tends to frustrate the passengers on board the elevator car and those waiting at the landing.

SUMMARY

An illustrative example elevator system includes a plurality of elevator cars. A dispatch controller assigns a first one of the elevator cars to travel to a landing in response to a first request for elevator service at that landing. At least one call button is operative to place a second request while the first one of the elevator cars is situated at the landing in response to the first request. The dispatch controller assigns a second one of the elevator cars to travel to the landing in response to the second request.

In an example embodiment having one or more features of the system of the previous paragraph, the at least one call button is at least one of a hall call button at the landing and a full car service request button in the elevator car.

In an example embodiment having one or more features of the system of any of the previous paragraphs, the hall call button is operative to place the first request and the second request.

In an example embodiment having one or more features of the system of any of the previous paragraphs, the at least one call button comprises both of the hall call button and the full car service request button in the elevator car, and the dispatch controller responds to the second request from either of the hall call button or the full car service request button.

An example embodiment having one or more features of the system of any of the previous paragraphs includes at least one sensor that provides an output corresponding to at least one passenger at the landing that did not board the first one of the elevator cars and the dispatch controller determines whether the second request is valid dependent on the indication from the at least one sensor.

In an example embodiment having one or more features of the system of any of the previous paragraphs, the at least one sensor senses a load on the first one of the elevator cars and the output indicates no change in the load while the first one of the elevator cars is at the landing in response to the first request.

In an example embodiment having one or more features of the system of any of the previous paragraphs, the at least one sensor senses movement across a threshold of the first one of the elevator cars and the output indicates no movement across the threshold while the first one of the elevator cars is at the landing in response to the first request.

In an example embodiment having one or more features of the system of any of the previous paragraphs, the at least one sensor senses occupancy within the first one of the elevator cars and the output indicates no change in the occupancy while the first one of the elevator cars is at the landing in response to the first request.

In an example embodiment having one or more features of the system of any of the previous paragraphs, the at least one sensor senses the presence of at least one individual at the landing and the output indicates the presence of at least one individual at the landing and outside of the first one of the elevator cars while the first one of the elevator cars is at the landing in response to the first request.

An example embodiment having one or more features of the system of any of the previous paragraphs includes an indicator associated with the at least one call button, the indicator providing an indication that the at least one call button can be used to call another elevator car to the landing, the indicator providing the indication while the first one of the elevator cars is at the landing in response to the first request.

An illustrative example method of dispatching elevator cars includes assigning a first elevator car to travel to a landing in response to a first request for elevator service at the landing, receiving a second request for elevator service from at least one call button while the first elevator car is situated at the landing in response to the first request, and assigning a second elevator car to travel to the landing in response to the second request.

In an example embodiment having one or more features of the method of the previous paragraph, the at least one call button is at least one of a hall call button at the landing and a full car service request button in the elevator car.

In an example embodiment having one or more features of the method of any of the previous paragraphs, the hall call button is operative to place the first request and the second request.

In an example embodiment having one or more features of the method of any of the previous paragraphs, the at least one call button comprises both of the hall call button and the full car service request button in the elevator car, and receiving the second request comprises receiving the second request from either of the hall call button or the full car service request button.

An example embodiment having one or more features of the method of any of the previous paragraphs includes determining whether at least one passenger at the landing did not board the first elevator car while the first elevator car was at the landing in response to the first request and determining whether there is a valid second request dependent on determining that at least one passenger at the landing did not board the first elevator car.

In an example embodiment having one or more features of the method of any of the previous paragraphs, determining whether at least one passenger at the landing did not board the first elevator car comprises determining that there is no change in a load on the first elevator car while the first elevator car is at the landing in response to the first request.

In an example embodiment having one or more features of the method of any of the previous paragraphs, determining whether at least one passenger at the landing did not board the first elevator car comprises determining that there is no movement across a threshold of the first elevator car while the first elevator car is at the landing in response to the first request.

In an example embodiment having one or more features of the method of any of the previous paragraphs, determining whether at least one passenger at the landing did not board the first elevator car comprises determining that there is no change in an occupancy of the first elevator car while the first elevator car is at the landing in response to the first request.

In an example embodiment having one or more features of the method of any of the previous paragraphs, determining whether at least one passenger at the landing did not board the first elevator car comprises determining that there is at least one individual present at the landing and outside of the first elevator car while the first elevator car is at the landing in response to the first request.

An example embodiment having one or more features of the method of any of the previous paragraphs includes providing an indication that the at least one call button can be used to call another elevator car to the landing while the first elevator car is at the landing in response to the first request.

The various features and advantages of an example embodiment will become apparent to those skilled in the art from the following detailed description. The drawings that accompany the detailed description can be briefly described as follows.

DETAILED DESCRIPTION

Figure 1:
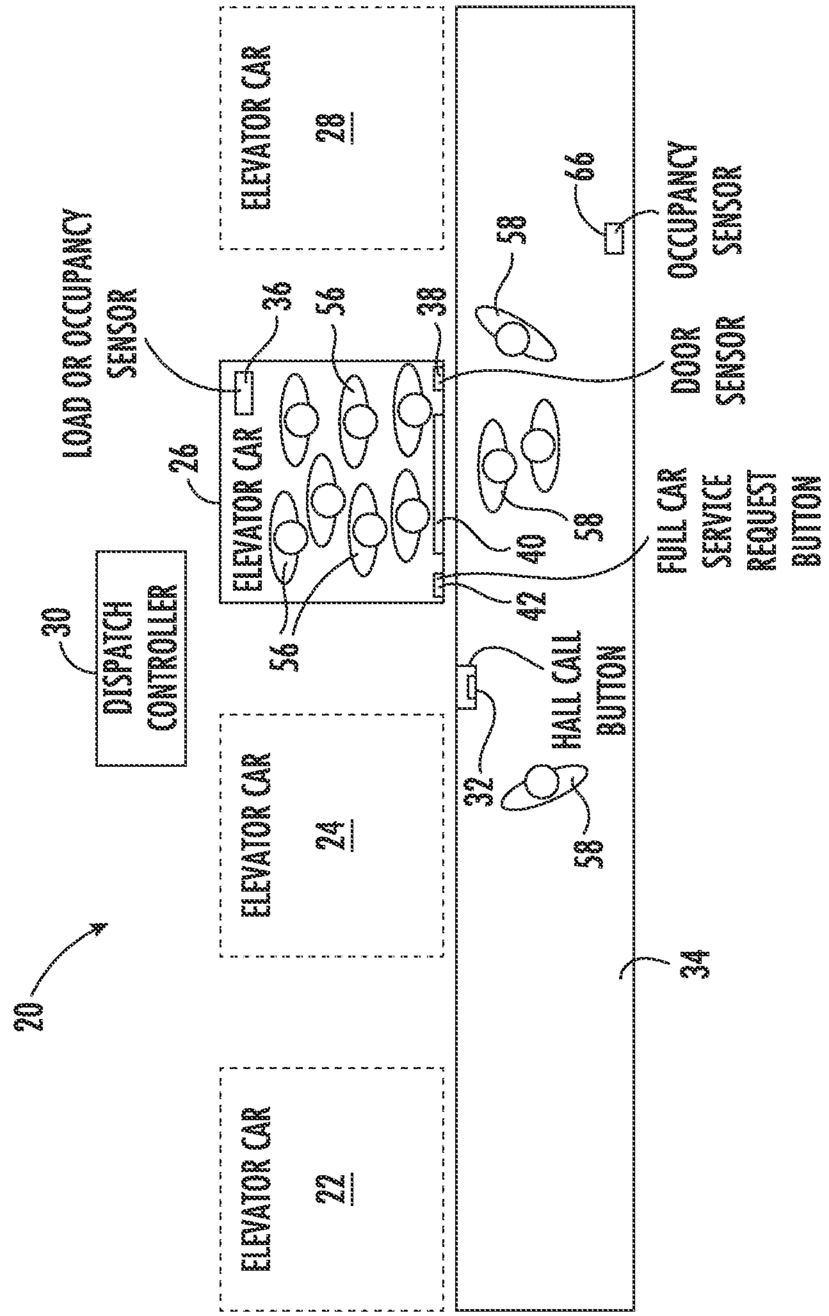
FIG. 1 schematically illustrates selected portions of an elevator system including improved call registration features.

FIG. 1 schematically illustrates selected portions of an elevator system 20. A plurality of elevator cars 22, 24, 26, and 28 are respectively assigned to passenger requests for elevator service by a dispatch controller 30.

The elevator system 20 includes at least one call button 32 at each of the landings serviced by the elevator system. An example landing 34 is schematically shown in FIG. 1. The call button 32 may be realized through a variety of known elevator fixtures. In some embodiments the call button 32 is part of a traditional hall call fixture that has up and down buttons. Other fixtures in some embodiments include a touch screen that is useful to place a call and may provide the ability for a passenger to indicate a desired destination floor.

As shown in FIG. 1, the elevator car 26 includes a sensor 36 that provides an indication of a load on the elevator car 26 or an occupancy of the elevator car 26. When the sensor 36 provides a load indication, known load sensors associated with the elevator car 26 provide such information. When the sensor 36 provides an indication of occupancy, the sensor may comprise a camera, depth sensor, infrared sensor, or any other desired type of sensor or combination thereof that detects the presence of one or more individuals within the elevator car 26.

A door sensor 38 provides an indication when an individual or object crosses a threshold 40 of the elevator car, such as when a passenger boards or exits the elevator car 26.

The elevator car 26 also includes a full car service request button 42, which may be incorporated into a car operating panel inside the elevator car 26.

Although not specifically illustrated, each of the elevator cars 22, 24, and 28 include the same features as shown on the elevator car 26 in FIG. 1.

Figure 2:
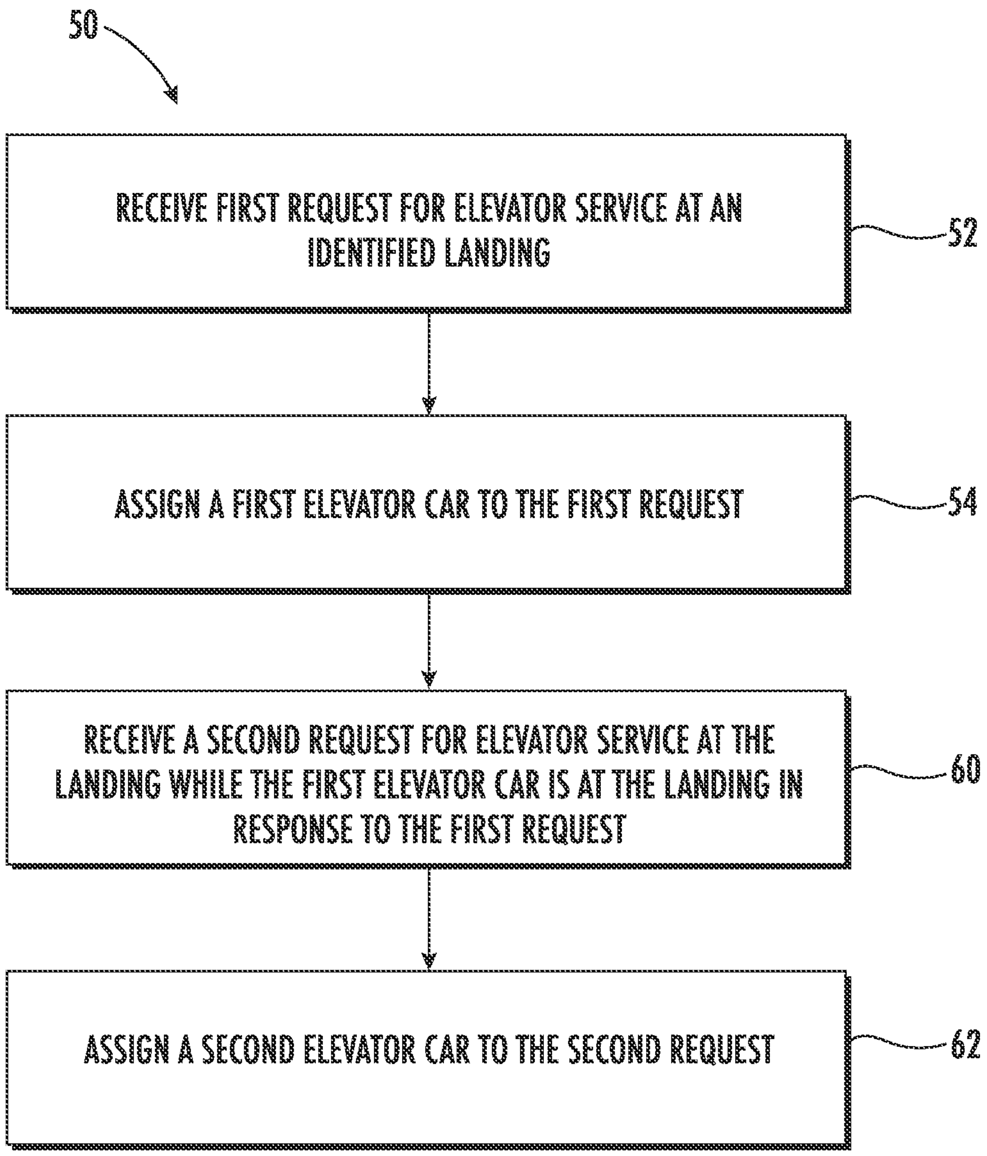
FIG. 2 is a flowchart diagram summarizing an example improved call registration strategy.

FIG. 2 is a flowchart diagram 50 that summarizes an example approach used by the dispatch controller 30 for assigning elevator cars to passenger service requests. At 52, the dispatch controller 30 receives a first request for elevator service at an identified landing. The first request may be placed by a passenger using the call button 32 at the landing 34 in FIG. 1, for example. At 54, the dispatch controller 30 assigns a first elevator car to travel to the landing 34 in response to the first request.

As shown in FIG. 1, the dispatch controller 30 assigns the elevator car 26 to the first request. The elevator car 26 is already substantially full with passengers 56. There is no room for any of the potential passengers 58 to board the elevator car 26.

Under these circumstances, the call button 32 and the full car service request button 42 become operative to allow an individual to place a second request for elevator service at the landing 34. In FIG. 2 at 60, the dispatch controller 30 receives a second request for elevator service at the landing 34 while the elevator car 26 is at that landing in response to the first request. Either a potential passenger 58 using the call button 32, or a passenger 56 on board the elevator car 26 using the full car service request button 42 may place the call resulting in the second request received by the dispatch controller 30. At 62, the dispatch controller 30 assigns a different one of the elevator cars 22, 24, or 28 to the second request. Allowing at least one of the call buttons 32 or 42 to place a second request while the elevator car 26 is still at the landing 34 allows the elevator car 26 to proceed away from the landing 34 without further interruption and reduces the amount of time that the potential passengers 58 have to wait for another elevator car.

The dispatch controller 30 determines when to interpret access or activation of the call button 32 or the full car service request button 42 as a second request for elevator service at the landing 34 by determining whether at least one passenger at the landing 34 did not board the elevator car 26 while that elevator car was at the landing 34 in response to the first request. Whether a second request is valid depends on determining that at least one passenger at the landing 34 did not board the elevator car 26, which was assigned to the first request. The dispatch controller 30 makes such a determination in one of a plurality of possible ways in the illustrated embodiment.

Information regarding the load on the elevator car 26 from the load or occupancy sensor 36 indicates whether there was any change in the load on the elevator car 26 while it was at the landing 34 in response to the first service request. If there is no change in the load, that is an indication that no one has boarded or exited the elevator car 26. The dispatch controller 30 uses the output from the load or occupancy sensor 36 to determine that no additional passengers have boarded the elevator car 26 while it was at the landing 34 in response to the first service request and, therefore, recognizes a second request placed through the call button 32 or the full car service request button 42 as a valid second request.

When the dispatch controller 30 uses occupancy information from the load or occupancy sensor 36 in the elevator car 26, information regarding a change in the occupancy of the elevator car is used by the dispatch controller 30 to determine whether a second request is valid.

In some embodiments, the dispatch controller 30 uses information from the door sensor 38 to determine whether at least one individual has crossed the threshold 40 of the elevator car 26 while it is at the landing 34 in response to the first service request. If the door sensor 38 does not indicate any such movement, the dispatch controller 30 determines that at least one passenger is still waiting at the landing 34 to board an elevator car and recognizes a second service request as a valid request.

The embodiment of FIG. 1 also includes an optional occupancy sensor 66 situated at the landing 34 to detect the presence of one or more individual potential passengers 58 at the landing 34. The occupancy sensor 66 may be a camera, depth sensor, infrared sensor, or any other desired type of sensor or combination thereof. The occupancy sensor 66 may also be an RFID tag or wireless communication device reader when potential passengers 58 carry RFID tags or other detectable devices. When the occupancy sensor 66 indicates that at least one potential passenger 58 is waiting at the landing 34 while the elevator car 26 is at that landing in response to the first service request, the dispatch controller 30 determines that a second service request is valid and assigns a second one of the elevator cars 22, 24, or 28 to that request.

When the dispatch controller 30 determines that the elevator car 26 was unable to accept at least one passenger at the landing 34, the call buttons 32 or 42 are enabled to place a call for another car traveling in the same direction that the elevator car 26 was travelling. For example, if the elevator car 26 was travelling down and stopped at the landing 34 in response to the first service request and if the call button 32 has up and down buttons, then only the down button will be enabled to place the second request while the car 26 remains at the landing 34. Similarly, under the same assumed scenario, the dispatch controller 30 will interpret activation of the full car service request button 42 as a second service request for another car to travel downward from the landing 34.

In some example embodiments, the call button 32 and the full car service request button 42 include an indicator that provides an indication that the call button can be used to call another elevator car to the landing 34 while one of the elevator cars is present at the landing in response to a first service request. The indicator may be a light, for example, a visual indication that a second request may be made, or an audible indication.

Embodiments such as that described above provide improved elevator service in situations where crowded or full cars are assigned to calls for elevator service and avoid passenger frustration that otherwise would result.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of dispatching elevator cars, the method comprising:
- assigning a first elevator car to travel to a landing in response to a first request for elevator service at the landing;
- receiving a second request for elevator service at the landing from at least one call button while the first elevator car is situated at the landing in response to the first request;
- determining whether at least one passenger at the landing did not board the first elevator car while the first elevator car was at the landing in response to the first request;
- determining whether there is a valid second request dependent on determining that at least one passenger at the landing did not board the first elevator car; and
- assigning a second, different elevator car to travel to the landing in response to the second request.

2. The method of claim 1, wherein the at least one call button is at least one of a hall call button at the landing and a full car service request button in the first elevator car.

3. The method of claim 2, wherein the hall call button is operative to place the first request and the second request.

4. The method of claim 2, wherein:
- the at least one call button comprises both of the hall call button and the full car service request button in the first elevator car; and
- receiving the second request comprises receiving the second request from either of the hall call button or the full car service request button.

5. The method of claim 1, wherein determining whether at least one passenger at the landing did not board the first elevator car comprises determining that there is no change in a load on the first elevator car while the first elevator car is at the landing in response to the first request.

6. The method of claim 1, wherein determining whether at least one passenger at the landing did not board the first elevator car comprises determining that there is no movement across a threshold of the first elevator car while the first elevator car is at the landing in response to the first request.

7. The method of claim 1, wherein determining whether at least one passenger at the landing did not board the first elevator car comprises determining that there is no change in an occupancy of the first elevator car while the first elevator car is at the landing in response to the first request.

8. The method of claim 1, wherein determining whether at least one passenger at the landing did not board the first elevator car comprises determining that there is at least one individual present at the landing and outside of the first elevator car while the first elevator car is at the landing in response to the first request.

9. The method of claim 1, comprising providing an indication that the at least one call button can be used to call another elevator car to the landing while the first elevator car is at the landing in response to the first request.

10. The method of claim 1, including sensing whether the at least one passenger at the landing did not board the first elevator car while the first elevator car was at the landing in response to the first request, and determining whether there is a valid second request dependent on a sensed indication that the at least one passenger at the landing did not board the first elevator car while the first elevator car was at the landing in response to the first request.

11. The method of claim 10, including monitoring output from a load or occupancy sensor to determine that the at least one passenger at the landing did not board the first elevator car while the first elevator car was at the landing in response to the first request.

12. The method of claim 10, including monitoring output from a door sensor to determine whether the at least one passenger has crossed a threshold of the first elevator car while at the landing in response to the first request, and wherein, if the door sensor does not indicate any such threshold movement, a determination is made that the at least one passenger is still waiting at the landing.

13. The method of claim 10, including monitoring output from an occupancy sensor situated at the landing to detect a presence of one or more individual potential passengers at the landing, and, when the occupancy sensor indicates that the at least one passenger is waiting at the landing while the first elevator car is at that landing in response to the first request, a determination is made that there is a valid second request.

14. An elevator system, comprising:

a plurality of elevator cars;

a dispatch controller that assigns a first elevator car of the plurality of elevator cars to travel to a landing in response to a first request for elevator service at the landing; and at least one full car service request button that is operative to place a second request for elevator service at the landing while the first elevator car is situated at the landing in response to the first request; and wherein the dispatch controller assigns a second elevator car of the plurality of elevator cars to travel to the landing in response to the second request and a sensed verification that there is at least one passenger at the landing that did not board the first elevator car.

15. The elevator system of claim 14, wherein the at least one full car service request button is situated in at least one of a hall at the landing and the first elevator car.

16. The elevator system of claim 15, wherein the at least one full car service request button comprises a first button that is situated in hall at the landing and a second button in the first elevator car.

17. The elevator system of claim 14, including at least one sensor to identify whether the at least one passenger at the landing did not board the first elevator car while the first elevator car was at the landing in response to the first request, and wherein the dispatch controller determines whether the second request is valid dependent a sensed indication that the at least one passenger at the landing did not board the first elevator car while the first elevator car was at the landing in response to the first request.

18. The elevator system of claim 14, including at least one sensor that provides an output corresponding to the at least one passenger at the landing that did not board the first elevator car, and wherein the dispatch controller determines whether the second request is valid dependent on an indication from the at least one sensor and the second elevator car to travel to the landing in response to the second request.

19. The elevator system of claim 18, wherein:

the at least one sensor senses a load on the first elevator car, and the output indicates no change in the load while the first elevator car is at the landing in response to the first request;

the at least one sensor senses movement across a threshold of the first elevator car, and the output indicates no movement across the threshold while the first elevator car is at the landing in response to the first request;

the at least one sensor senses occupancy within the first elevator car, and the output indicates no change in the occupancy while the first elevator car is at the landing in response to the first request; and/or the at least one sensor senses a presence of the at least one passenger at the landing, and the output indicates the presence of the at least one passenger at the landing and outside of the first elevator car while the first elevator car is at the landing in response to the first request.

* * * * *